United States Patent [19]
Ries et al.

[11] Patent Number: 5,734,877
[45] Date of Patent: Mar. 31, 1998

[54] PROCESSOR CHIP HAVING ON-CHIP CIRCUITRY FOR GENERATING A PROGRAMMABLE EXTERNAL CLOCK SIGNAL AND FOR CONTROLLING DATA PATTERNS

[75] Inventors: Paul S. Ries; John R. Kinsel, both of San Jose; Thomas J. Riordan, Los Altos; Albert M. Thaik, San Jose, all of Calif.

[73] Assignee: Silicon Graphics, Inc., Mountain View, Calif.

[21] Appl. No.: 715,246

[22] Filed: Sep. 19, 1996

Related U.S. Application Data

[63] Continuation of Ser. No. 353,169, Dec. 8, 1994, abandoned, which is a continuation of Ser. No. 942,675, Sep. 9, 1992, abandoned.

[51] Int. Cl.⁶ .................................................. G06F 1/04
[52] U.S. Cl. ................................... 395/555; 395/556
[58] Field of Search ............................. 395/551, 555, 395/556, 559

[56] References Cited

U.S. PATENT DOCUMENTS

| | | | |
|---|---|---|---|
| 4,321,687 | 3/1982 | Parsons et al. | 395/556 |
| 4,409,671 | 10/1983 | Daniels et al. | 395/800 |
| 4,413,350 | 11/1983 | Bond et al. | 377/47 |
| 4,423,383 | 12/1983 | Svendsen | 327/114 |
| 4,689,581 | 8/1987 | Talbot | 331/1 A |
| 4,719,593 | 1/1988 | Threewitt et al. | 395/555 |
| 4,745,573 | 5/1988 | Lebel | 395/555 |
| 4,819,164 | 4/1989 | Branson | 395/556 |
| 4,931,748 | 6/1990 | McDermott et al. | 331/1 A |
| 4,947,411 | 8/1990 | Shiraishi et al. | 377/47 |
| 4,956,798 | 9/1990 | Dinteman | 364/718 |
| 4,980,585 | 12/1990 | Bazes | 327/106 |
| 5,006,979 | 4/1991 | Yoshie et al. | 395/553 |
| 5,036,300 | 7/1991 | Nicolai | 331/143 |
| 5,047,924 | 9/1991 | Fujioka et al. | 395/556 |
| 5,077,686 | 12/1991 | Rubinstein | 395/556 |
| 5,133,064 | 7/1992 | Hotta et al. | 395/553 |
| 5,167,031 | 11/1992 | Watanabe | 395/556 |
| 5,168,360 | 12/1992 | Maeshima | 348/537 |
| 5,256,994 | 10/1993 | Langendorf | 331/16 |
| 5,274,796 | 12/1993 | Conner | 395/551 |
| 5,287,296 | 2/1994 | Bays et al. | 364/703 |
| 5,293,628 | 3/1994 | Langan et al. | 395/557 |
| 5,317,601 | 5/1994 | Riordan et al. | 375/356 |
| 5,335,037 | 8/1994 | Andersen et al. | 327/158 |
| 5,336,939 | 8/1994 | Eitrheim et al. | 327/291 |
| 5,349,544 | 9/1994 | Wright et al. | 364/600 |
| 5,394,114 | 2/1995 | Davis | 331/1 A |
| 5,412,349 | 5/1995 | Young et al. | 331/34 |
| 5,446,867 | 8/1995 | Young et al. | 395/558 |

OTHER PUBLICATIONS

*IEEE Standard Dictionary of Electrical and Electronics Terms* (4th Edition), Institute of Electrical and Electronics Engineers, p. 808, 1988.

*Primary Examiner*—Parshotam S. Lall
*Assistant Examiner*—Viet Vu
*Attorney, Agent, or Firm*—Sterne, Kessler, Goldstein & Fox P.L.L.C.

[57] ABSTRACT

Techniques for matching the speed of a microprocessor to potentially slower external system components. A master clock signal is communicated to a clock generator on the processor chip. The clock generator provides at least one external clock signal, which is communicated to various portions of the system. The clock generator includes programmable clock division circuitry that allows the external clock signal to be generated at any selected one of a plurality of fractions of the master clock frequency. The data pattern (the particular cycles in a sequence during which the processor outputs a data word as part of a multiple-data-word sequence) is programmable independently of the external clock programming.

5 Claims, 4 Drawing Sheets

PROCESSOR CHIP HAVING ON-CHIP CIRCUITRY FOR GENERATING A PROGRAMMABLE EXTERNAL CLOCK SIGNAL AND FOR CONTROLLING DATA PATTERNS

This application is a continuation of application Ser. No. 08/353,169, filed Dec. 8, 1994 now abandoned, which is a continuation of Ser. No. 07/942,675; filed Sep. 9, 1992, now abandoned.

BACKGROUND OF THE INVENTION

The present invention relates generally to integrated circuit devices (chips), and more specifically to techniques for coordinating the timing of a microprocessor chip and an external system.

In a personal computer or workstation comprising a microprocessor chip and external (or "off-chip") system components (system logic, memory, peripheral controllers, etc.), timing signals ("clock signals," or simply "clocks") for various parts of the system are typically derived from a single off-chip master oscillator. Computer designers have long recognized that different parts of the system operate at different speeds, and various data buffering, caching, and interrupt strategies have been devised to prevent overall operation speed from being dragged down to that of the slowest subsystem.

While increases in processor speeds have been accompanied by increases (perhaps more modest) in external component speeds, a gap remains. While performance problems relating to mismatches in speed can in principle be minimized by using the fastest components, considerations such as cost and availability may dictate otherwise.

SUMMARY OF THE INVENTION

The present invention provides techniques for matching the speed of a microprocessor to potentially slower external system components.

According to one aspect of the invention, a master clock signal is communicated to a clock generator on the processor chip. The clock generator provides at least one external clock signal, which is communicated to various portions of the system. The clock generator includes programmable clock division circuitry that allows the external clock signal to be generated at any selected one of a plurality of fractions of the master clock frequency.

In a specific embodiment, the clock generator includes a phase-lock loop ("PLL") that generates an internal signal at four times the master frequency, and the programmable clock division circuitry allows the frequency to be divided by 4, 6, or 8 so that an external signal is available at the master clock frequency, ⅔ the master clock frequency, or ½ the master clock frequency. In this embodiment there are two external clocks (RClock and TClock), skewed 90° to each other, one for use as a receive clock by registers that sample processor outputs, the other for use as a transmit clock by registers that drive processor inputs. There is also an internal clock (SClock) at the same frequency and in phase with TClock, which is used by the processor to clock its I/O latches (system interface). The particular clock divisor for RClock, TClock, and SClock is typically determined by the system designer, taking into account the various properties of the system. A representation of the divisor is preferably read into a configuration register at boot time.

According to a further aspect of the invention, the data pattern (the particular cycles in a sequence during which the processor outputs a data word as part of a multiple-data-word sequence) is programmable independently of the external clock programming. In the specific embodiment, the processor can output data words at various average rates between the system clock rate and ¼ that rate, and according to different data patterns. A representation of the data pattern is also read into the configuration register at boot time. The programmable data pattern provides the system designer an additional degree of freedom.

A further understanding of the nature and advantages of the present invention may be realized by reference to the remaining portions of the specification and the drawings.

DESCRIPTION OF SPECIFIC EMBODIMENTS

Figure 1:
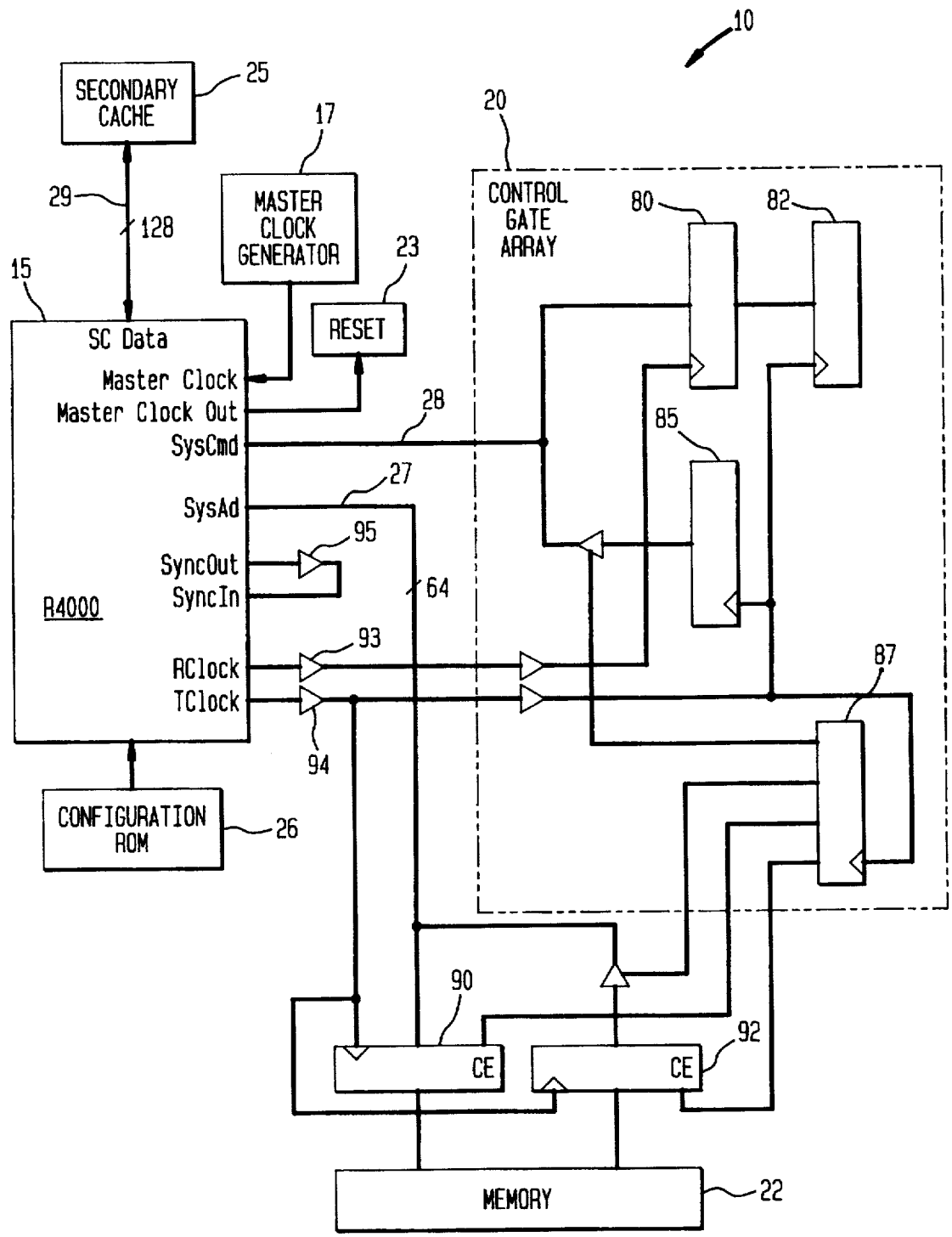
FIG. 1 is a block diagram of a computer system incorporating the system timing improvements of the present invention.

FIG. 1 is a block diagram of a computer system 10 incorporating the system timing improvements of the present invention. In accordance with known practice, the system includes a microprocessor chip 15, an off-chip master clock generator 17, and additional off-chip system elements. In a specific embodiment, the microprocessor (often referred to simply as the "processor" or as the "chip") is a CMOS superpipelined RISC processor (MIPS R4000). The system elements are shown as including a control gate array device ("gate array") 20, a memory 22, and external reset logic 23. The processor is also shown as coupled to an external secondary cache 25 and a configuration ROM 26, which in the specific embodiment is a serial ROM. Associated with the system elements are various registers, the significance of which will be discussed below. The processor communicates with the external elements via a number of buses and control lines, including a 64-bit system address/data bus 27 (SysAD), a system command/data identifier bus 28 (SysCmd), and a 128-bit secondary cache data bus 29 (SCData).

All processor and system timing is derived from master clock generator 17, which provides a signal, called MasterClock, to the processor. In a particular embodiment, MasterClock is a 50-MHz signal. The frequency of the master clock signal is often referred to as 1x. Certain aspects of the present invention relate to the programmability of the timing and the timing structure of communications between the processor and the external elements. In the specific embodiment, configuration information is read in from the configuration ROM at boot time.

Figure 2:
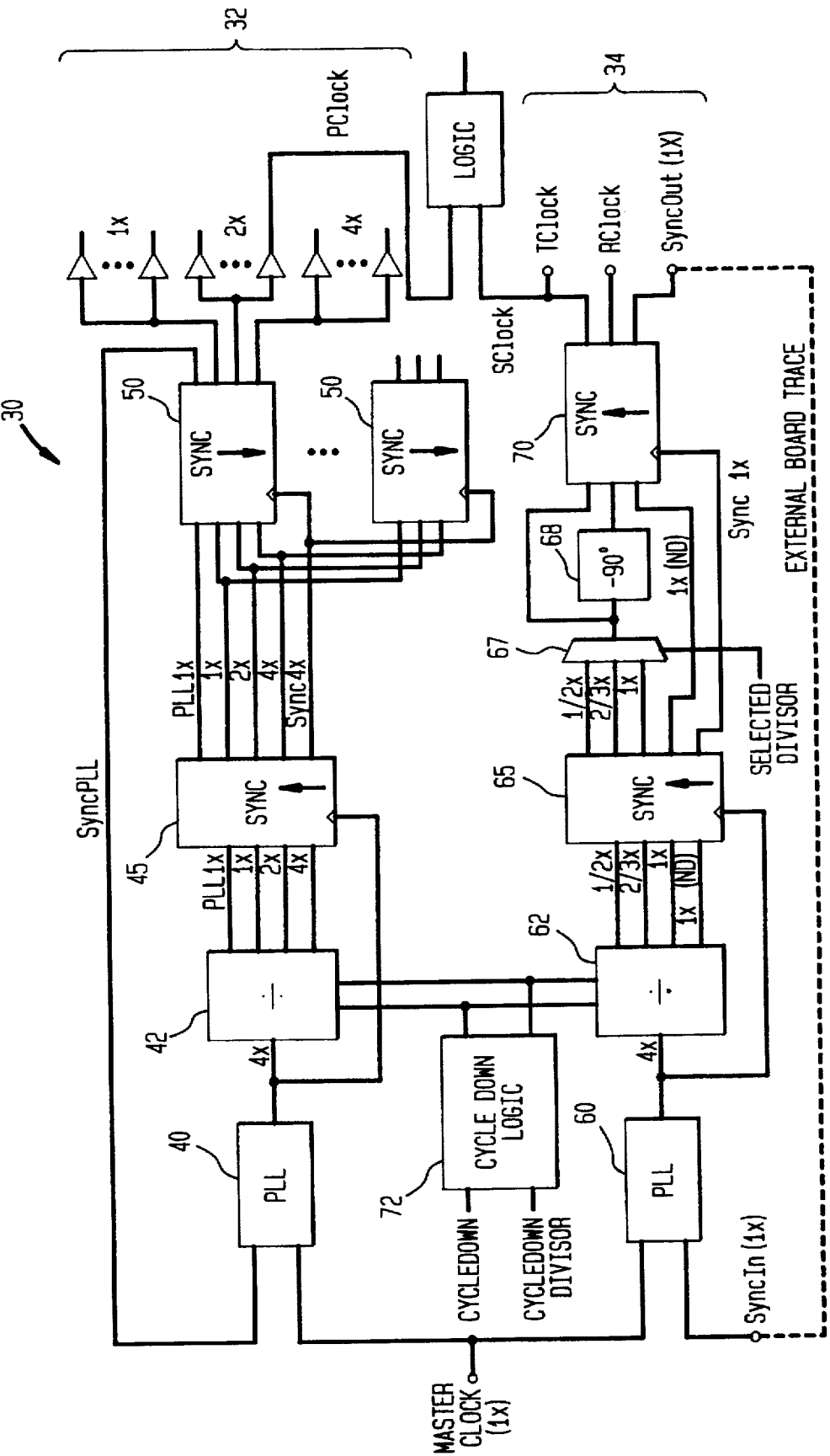
FIG. 2 is a block diagram of circuitry on the processor chip for generating internal and external clock.

FIG. 2 is a block diagram of clock generation circuitry 30 on processor chip 15. The clock generation circuitry can be considered to include an internal clock generator 32 and an external clock generator 35. The internal clock generator generates a number of clock signals for use by the processor circuitry, while the external clock generator generates a number of clock signals, at least some of which are made available to the off-chip system elements. All the generated clock signals have, by virtue of the way they are generated, a 50% duty cycle.

Certain aspects of internal clock generator 32 are the subject of commonly-owned co-pending U.S. patent application Ser. No. 07/933,467, filed Aug. 21, 1992, titled CLOCK DISTRIBUTION SYSTEM FOR AN INTEGRATED CIRCUIT DEVICE, now U.S. Pat. No. 5,317,601, issued May 31, 1994, which is incorporated by reference. For present purposes, it suffices to note that the internal clock generator includes a phase-lock loop ("PLL") 40, a clock divider 42, and an initial synchronization circuit 45, all located in generally a single region of the chip, and a plurality of remote synchronization circuits 50 located at a corresponding plurality of distributed regions on the chip. The PLL receives MasterClock at a first input and generates a signal at four times the master clock frequency. The clock divider divides this signal and provides signals at the master clock frequency, two times the master clock frequency, and four times the master clock frequency. The signals at these frequencies, referred to as 1x, 2x, and 4x, and a pair of additional signals PLL1x and Sync4x are synchronized and distributed to the remote locations, where they are again synchronized to Sync4x. The signal at 2x, referred to as PClock (pipeline clock), has every other rising edge aligned with the rising edge of MasterClock and is used by the processor's internal registers and latches (but not the system interface). The synchronized PLL1x signal from one of the remote locations is fed back as SyncPLL to a second input of PLL 40 for overall synchronization.

External clock generator 35 includes a PLL 60, a clock divider 62, an initial synchronization circuit 65, a multiplexer 67, a 90° phase shifter 68, and a final synchronization circuit 70. The PLL receives MasterClock at a first input and generates an internal signal at 4x. The clock divider divides this signal by factors of 4, 6, and 8, and provides signals at 1x, ⅔x, and ½x. These signals are synchronized and one of the three is selected at the multiplexer on the basis of a desired external clock divisor (programmable at boot time). The selected signal, and a version thereof that is phase shifted by a quarter cycle are again synchronized to generate an internal signal SClock, an external signal TClock in phase with SClock, and an external signal RClock that leads TClock by a quarter cycle, all three at the same selected frequency (1x, ⅔x, or ½x). An additional signal 1x(ND) is used to generate two external signals SyncOut and MasterOut, both at 1x, regardless of the selected frequency. SyncOut (at 1x) is fed back via an external circuit board trace to a SyncIn input pin on the chip and then to a second input of PLL 60 for overall synchronization.

The clock generation circuitry optionally includes cycle-down circuitry 72 that cooperates with the clock division circuitry to provide the ability to divide the internal and external clock signals by fixed divisors during machine operation without destroying the state of the machine. In the specific embodiment, division by 2, 4, 8, or 16 is possible, depending on the state of a CycleDown signal (a bit in the processor's status register) and the value of a CycleDown divisor (also programmable at boot time). This is referred to as operation in the cycle-down mode.

In the cycle-down mode, the internal clock signals at 1x, 2x, and 4x are distributed at the further divided-down frequencies, but the Sync4x and PLL1x signals are distributed without being divided. Similarly, the signals 1x, ⅔x, and ½x are further divided down by the CycleDown divisor to generate divided-down SClock, TClock, and RClock, but the 1x(ND) signal is not divided so that MasterOut and SyncOut are generated at the MasterClock frequency. The primary benefit of a cycle-down feature is that the processor and system can be slowed down and consume less power when they are not being actively used. The cycle-down feature is not part of the invention, and the discussions that follow will assume that the CycleDown signal is not asserted so that there is no division by the CycleDown Divisor. The cycle-down feature may impose tighter timing constraints, and thus may require that steps be taken to synchronize the two PLLs.

Figure 3A:
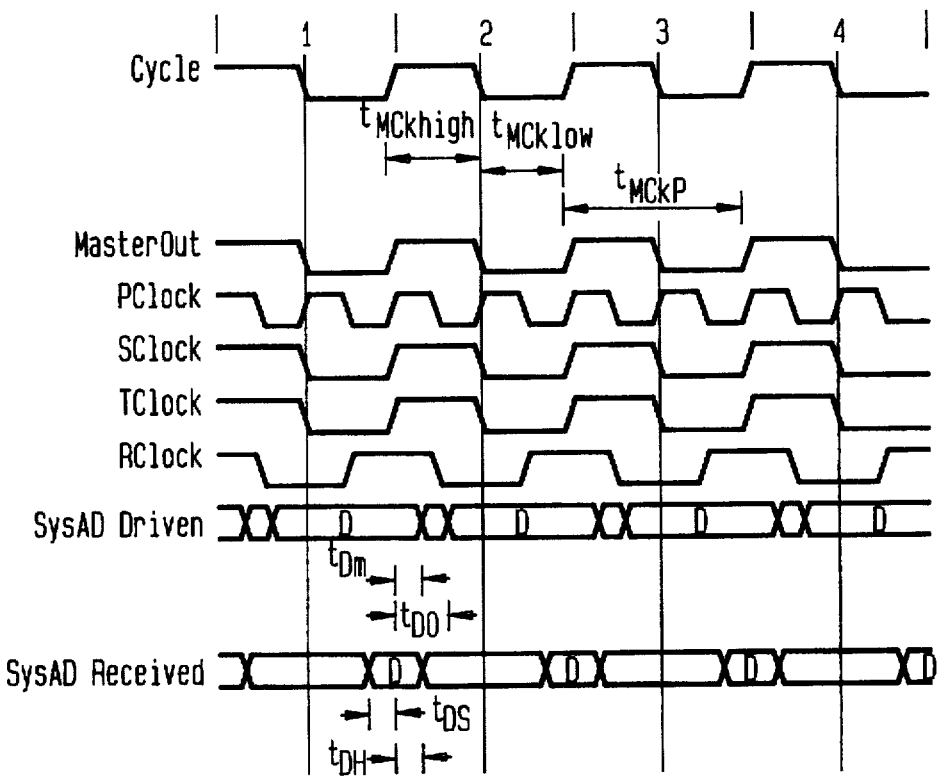
FIGS. 3A and 3B are timing diagrams illustrating the programmable clock division according to the present invention.
Figure 3B:
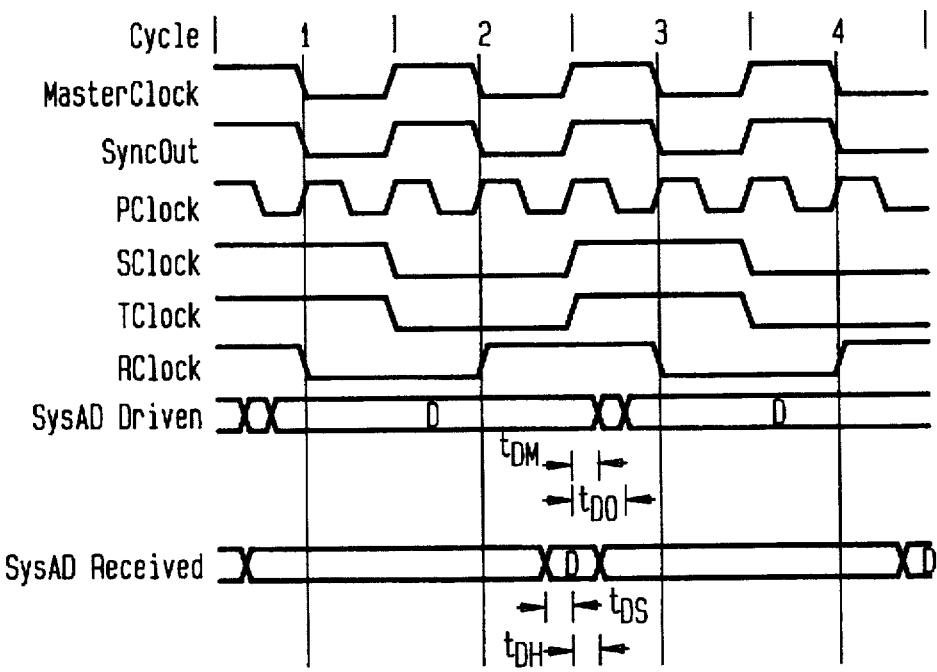

FIG. 3A is a timing diagram showing the various internal and external signals described above for the case where the selected signal is at 1x so that SClock, RClock, and TClock have the same frequency as MasterClock. Also shown are the intervals during which SysAD may be driven by the processor and the intervals during which the processor may receive data on SysAD. FIG. 3B is a corresponding timing diagram for the case where the selected signal is at ½x so that SClock, RClock, and TClock have a frequency that is ½ that of MasterClock.

The notations $t_{DM}$, $t_{DO}$, $t_{DS}$, and $t_{DO}$ in the timing diagrams refer to the data output minimum, data output maximum, data setup, and data hold times. Data provided to the processor must be stable a minimum of $t_{DS}$ (3 ns) before the rising edge of SClock and held valid for a minimum of $t_{DH}$ (2 ns) after the rising edge of SClock. This setup and hold time is required for data to propagate through the processor's input buffers and meet the setup and hold time requirements of the processor's input latches. Data provided by the processor becomes stable a minimum of $t_{DM}$ (2 ns) after the rising edge of SClock and a maximum of $t_{DO}$ (10 ns) after the rising edge of SClock. This drive-off time is the sum of the maximum delay through the processor's output drivers and the maximum clock to Q delay of the processor's output registers. These numbers are for a 50-MHz master clock frequency assuming a 50-pf capacitive load.

The general properties and uses of the various clock signals can be summarized as follows.

MasterOut is generated at 1x and has its edges aligned with MasterClock. MasterOut is provided for use in clocking external logic that must cycle at the MasterClock frequency, such as external reset logic 23. SyncOut is generated at 1x and is aligned with MasterClock. The feedback connection between the SyncOut and SyncIn pins makes it possible to compensate for output driver delays and input buffer delays in aligning SyncOut with MasterClock.

SClock is generated at 1x, ⅔x, or ½x and is used by the processor to sample data at the system interface and to clock data into the processor's system interface output registers. The processor can thus support a data rate of one 64-bit doubleword onto or off of the SysAD bus per SClock cycle.

The RClock and TClock signals are generated at the same frequency as SClock and are used by the external system components shown in FIG. 1, as will now be described. Gate array 20 is shown as having a sampling register 80 and a staging register 82, for transfers from the processor, a register 85 for transfers to the processor, and a control register 87 for controlling transfers to the processor. The gate array buffers RClock and TClock internally. Associated with memory 22 are a sampling register 90 and a memory output register 92.

RClock is a receive clock is used by the gate array as a receive clock, and the buffered version is used to clock registers that sample processor outputs, such as sampling register 80. The buffered version of TClock is used to clock staging register 82, and is used as the global system clock for the gate array's internal circuitry and as the clock for all registers that drive processor inputs. TClock is also used to clock registers 90 and 92, which are not part of the gate array. Since registers 90 and 92 do not buffer the clocks, it is preferred to buffer RClock and TClock (externally with respect to the processor and gate array) using buffers 93 and 94. Insertion of a matched buffer 95 into the feedback path allows the PLL to null out buffer delays.

Figure 4:
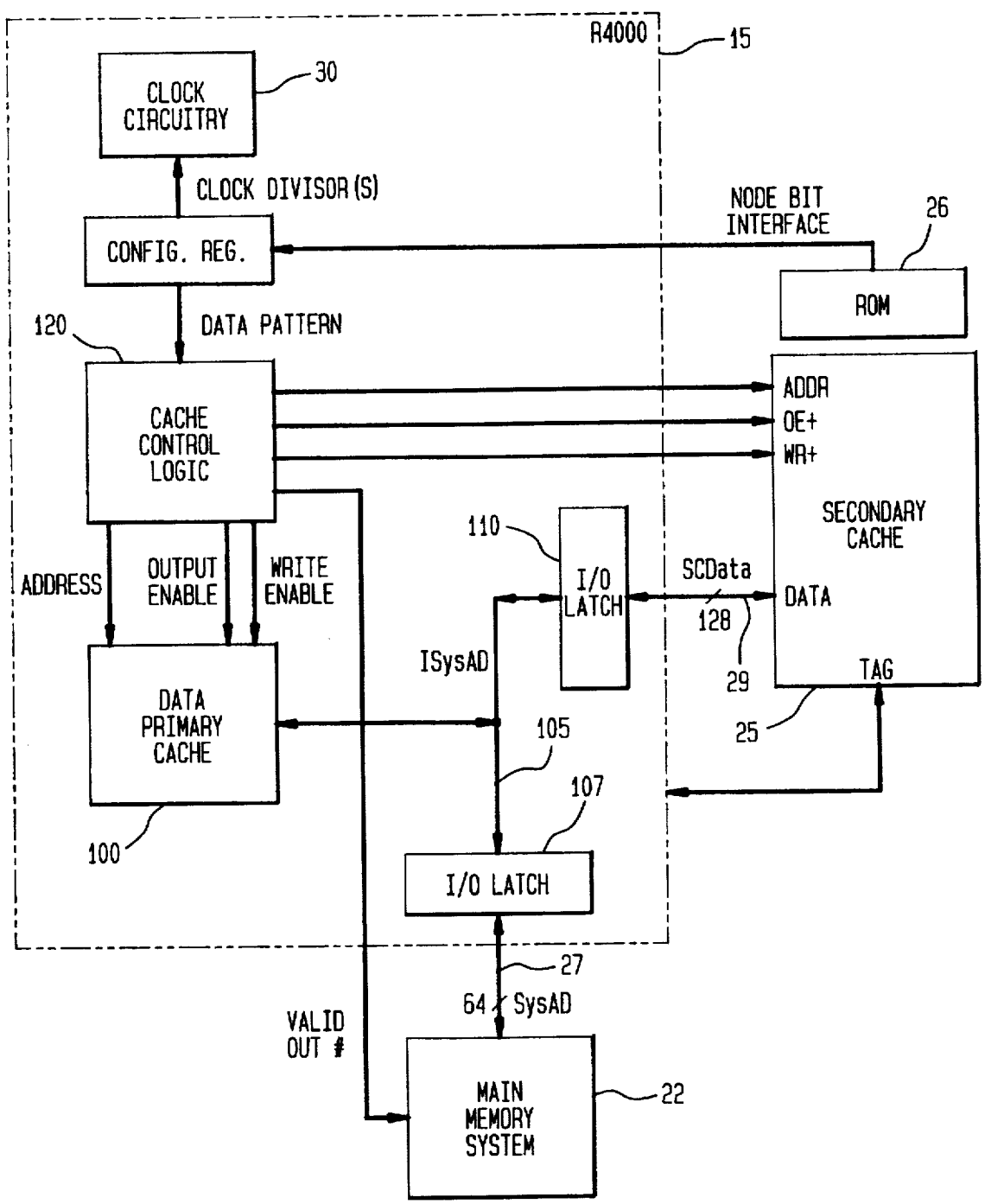
FIG. 4 is a block diagram of the processor chip and external memories.

FIG. 4 is a block diagram of the processor chip and certain of its interfaces, showing the manner that configuration information is used to control system timing. As can be seen, processor 15 includes an internal primary data cache 100, which communicates with the external memory elements (main memory 22 and secondary cache 25) via an internal system address/data bus 105 (ISysAD). I/O latches 107 and 110 couple ISysAD bus 105 to the external memory buses (SysAD bus 27 and SCData bus 29). Cache control logic 120 controls the data flow between the primary cache and the external memory elements. The figure is not intended to be a comprehensive view of the processor, and only a few of the control signals, relevant to the timing, are shown.

A configuration register 130 is loaded from configuration ROM 26 at boot time and provides a number of control bits specifying the fundamental operational modes of the processor. The particular mechanism for transferring the configuration information is not part of the invention, and will not be described in detail. It is noted, however that on reset (power-on or cold reset), the processor reads a 256-bit serial stream on a ModeIn line at a bit rate equal to the MasterClock frequency divided by 256. The information includes such parameters as byte ordering, secondary cache configuration, and package type, which do not directly relate to the invention, and other parameters such as clock divisors and cache data patterns, which do directly relate to the invention. The specific bit definitions are set forth in Table 1.

As described above, SClock, RClock, and TClock are generated at a frequency that is a selected fraction of the PClock frequency. This selection is shown in FIG. 2 as being effected by multiplexer 67, with a notation that the signal at the multiplexer's select input specifies the selected or desired fraction. As can be seen in Table 1, bits 15–17 are encoded to provide a representation of the desired external clock divisor, and these bits are used to provide the selection signal. The selected clock divisor remains fixed once it is read into the configuration register.

A representation of the CycleDown divisor is also loaded into the configuration register at boot time (being encoded at bits 47–49) and remains fixed. However, as mentioned above, the frequency division for the external clock signals is fixed during operation while the division of internal and external clocks associated with the cycle-down feature is controlled by a bit in the status register, which bit can be set and reset during operation. The cycle-down circuitry operates to ensure that all the clock signals have their rising edges aligned when the frequencies shift so that the machine state is preserved.

An additional field in the configuration register is the transmit data pattern, a representation of which is encoded at bits 11–14. The data pattern refers to the set of SClock cycles within a sequence during which the processor outputs data words (actually 64-bit doublewords) in a multiword transfer onto the SysAD bus. As can be seen in Table 1, the possible data patterns range from a doubleword every cycle (pattern D, or equivalently DD) to a doubleword every fourth cycle (pattern DxxxDxxx). The letter D refers to a data cycle while the letter x refers to an unused cycle. These data patterns are primarily used for transfers from the secondary cache to main memory, and the need to limit the rate of data transfers could arise from bandwidth limitations on either external memory. In the particular embodiment illustrated, the secondary cache outputs two doublewords (128 bits) at a time while the internal and external system buses are 64 bits wide. Thus there is appropriate data staging associated with I/O latch 110.

The processor imposes the data patterns by asserting ValidOut* (seen by the main memory) only on the cycles designated by the specified data pattern, and by controlling the Addr and OE, lines to the secondary cache appropriately. It should be understood that the processor can only read from or write to one external memory at a time. Thus a transfer from the secondary cache to main memory would entail latching 128 bits from the secondary cache during one cycle, and writing the data during later cycles, 64 bits on a given cycle, to main memory over the designated pattern of cycles.

The possible data patterns include a number of patterns wherein the doublewords are output at a uniform rate (patterns D, DxDx, DxxDxx, and DxxxDxxx) and a number of patterns having two doublewords output on successive cycles followed by one or more cycles with no data out (patterns DDx, DDxx, DDxxx, DDxxxx, and DDxxxxxx). If the limitation is on the bus speed or on the memory's ability to accept data, pattern DxDx or pattern DxxDxx might be appropriate. A pattern such as DDxx could be appropriate where two interleaved memory elements each require three cycles after accepting data before being ready to accept data again.

In such a case, the processor could output the data on two successive cycles, and free up the second memory sooner.

It is noted that the processor, while it can accept data at the SysAD interface at the rate of one doubleword per cycle, should not receive data destined for the secondary cache at a data rate faster than that at which the secondary cache can accept data. Therefore, an external system should send data at a rate that accommodates the secondary cache's write cycle time. Since the secondary cache is organized as a 128-bit RAM array, the processor will operate most efficiently if the data is delivered to the SysAD interface as two doublewords on successive cycles, possibly followed by a number of unused cycles as necessary to allow proper writing to the secondary cache. This type of data pattern is established by the system for processor reads from the SysAD bus, and is not to be confused with the data patterns, initially supplied by the system at boot time, that are used by the processor to limit the data rate of processor writes onto the SysAD bus.

In conclusion it can be seen that the present invention provides a high degree of flexibility in system design. The programmable clock division for the external clocks RClock and SClock and the internal system clock SClock allow a wide range of system components and configurations. At the same time, the programmable data patterns accommodate certain speed limitations without requiring that the entire system timing be slowed down.

While the above is a complete description of a specific embodiment of the invention, various modifications, alternative constructions, and equivalents may be used. For example, the particular clock divisors could be changed, and a different number could be provided to select from. Additionally, while the configuration information is shown as being provided via a serial interface, there are other possibilities. Therefore, the above description and illustrations should not be taken as limiting the scope of the invention which is defined by the claims.

TABLE 1

R4000 Boot Time Modes

| Serial Bit | Value | Mode Setting |
|---|---|---|
| 0 | | Blkorder: Secondary Cache Mode block read response ordering. |
| | 0 | Sequential ordering. |
| | 1 | Sub-block ordering. |
| 1 | | EIBParMode: Specifies nature of system interface check bus. |
| | 0 | SECDED error checking and correcting mode. |
| | 1 | Byte parity. |
| 2 | | EndBIt: Specifies byte ordering. |
| | 0 | Little Endian ordering. |
| | 1 | Big Endian ordering. |
| 3 | | DSh/MdDis: Dirty shared mode, enables transition to dirty shared state on processor update successful. |
| | 0 | Dirty shared mode enabled. |
| | 1 | Dirty shared mode disabled. |
| 4 | | NoSCMode: Specifies presence of secondary cache. |
| | 0 | Secondary cache present. |
| | 1 | No secondary cache present. |
| 5:6 | | SysPort: System Interface port width, bit 6 most significant. |
| | 0 | 64 bits. |
| | 1–3 | Reserved. |
| 7 | | SC64BitMd: Secondary cache interface port width. |
| | 0 | 128 bits. |
| | 1 | Reserved. |
| 8 | | EISpltMd: Specifies secondary cache organization. |
| | 0 | Secondary cache unified. |
| | 1 | Reserved. |
| 9:10 | | SCB1kSz: Secondary cache line size, bit 10 most significant. |
| | 0 | 4 words. |
| | 1 | 8 words. |
| | 2 | 16 words. |
| | 3 | 32 words. |
| 11:14 | | XmitDatpat: System interface data rate, bit 14 most significant. |
| | 0 | D |
| | 1 | DDx |
| | 2 | DDxx |
| | 3 | DxDx |
| | 4 | DDxxx |
| | 5 | DDxxxx |
| | 6 | DxxDxx |
| | 7 | DDxxxxxx |
| | 8 | DxxxDxxx |
| | 9–15 | Reserved. |
| 15:17 | | SysckRatio: PClock to SClock divisor, frequency relationship between SClock, RClock, and TClock and PClock, bit 17 most significant. |
| | 0 | Divide by 2. |
| | 1 | Divide by 3. |
| | 2 | Divide by 4. |
| | 3–7 | Reserved. |
| 18 | 0 | Reserved |
| 19 | | TimIntDis: Timer Interrupt enable allows a timer interrupts, otherwise the interrupt used by the timer becomes a general-purpose interrupt. |
| | 0 | Timer Interrupt enabled. |
| | 1 | Timer Interrupt disabled. |
| 20 | | PotupdDis: Potential update enable allows potential updates to be issued. Otherwise only compulsory updates are issued. |

TABLE 1-continued

R4000 Boot Time Modes

| Serial Bit | Value | Mode Setting |
|---|---|---|
| | 0 | Potential updates enabled. |
| | 1 | Potential updates disabled. |
| 21:24 | | TWrSUp: Secondary cache write deassertion delay, TWrSup in PCycles, bit 24 most significant. |
| | 0–2 | Undefined. |
| | 3–15 | Number of PCLK cycles; Min 3; Max 15. |
| 25:26 | | TWr2Dly: Secondary cache write assertion delay 2, TWr2Dly in PCycles, bit 26 most significant. |
| | 0 | Undefined. |
| | 1–3 | Number of PCLK cycles; Min 1, Max 3. |
| 27:28 | | TWr1Dly: Secondary cache write assertion delay 1, TWr1Dly in Pcycles, bit 28 most significant. |
| | 0 | Undefined. |
| | 1–3 | Number of PCLK cycles; Min 1, Max 3. |
| 29 | | TWrRC: Secondary cache write recovery time, TWrRc in Pcycles, either 0 or 1 cycles. |
| | 0 | 0 cycle. |
| | 1 | 1 cycle. |
| 30:32 | | TDis: Secondary cache disable time, TDis in Pcycles, bit 32 most significant. |
| | 0–1 | Undefined. |
| | 2–7 | Number of PCLK cycles; Min 2, Max 7. |
| 33:36 | | TRd2Cyc: Secondary cache read cycle time 2, TRdCyc2 in PCycles, bit 36 most significant. |
| | 0–2 | Undefined. |
| | 3–15 | Number of PCLK cycles; Min 3; Max 15. |
| 37:40 | | TRd1Cyc: Secondary cache read cycle time 1, TRdCyc1 in PCycles, bit 40 most significant. |
| | 0–3 | Undefined. |
| | 4–15 | Number of PCLK cycles; Min 4; Max 15. |
| 41:45 | 0 | Reserved. |
| 46 | | Pkg179: R4000 Package type. |
| | 0 | Large (447 pin). |
| | 1 | Small (179 pin). |
| 47:49 | | CycDivisor: This mode determines the clock divisor for the reduced power mode. When the RP bit in the Status Register is set to one, the pipeline clock is divided by one of the following values. Bit 49 is most significant. |
| | 0 | Divide by 2. |
| | 1 | Divide by 4. |
| | 2 | Divide by 8. |
| | 3 | Divide by 16. |
| | 4–7 | Reserved. |
| 50:52 | | Drv0_50, Drv0_75, Drv1_00: Drive the outputs out in N x Masterclock period. Bit 52 most significant. |
| | 0–1 | Drive at 0.50 × MasterClock period. |
| | 2–3 | Drive at 0.75 × Masterclock period. |
| | 4–7 | Drive at 1.00 × Masterclock period. |

TABLE 1-continued

R4000 Boot Time Modes

| Serial Bit | Value | Mode Setting |
|---|---|---|
| 53:56 | | InitP: Initial values for the state bits that determine the pull-down di/dt and switching speed of the output buffers. Bit 53 is the most significant. |
| | 0 | Fastest pull-down rate. |
| | 1–14 | Intermediate pull-down rates. |
| | 15 | Slowest pull-down rate. |
| 57:60 | | InitN: Initial values for the state bits that determine the pull-up di/dt and swtiching speed for the output buffers. Bit 57 is the most significant. |
| | 0 | Slowest pull-up rate. |
| | 1–14 | Intermediate pull-up rates. |
| | 15 | Fastest pull-up rate. |
| 61 | | EnblDPLLR: Enables the negative feedback loop that determines the di/dt and switching speed of the output buffers only during ColdReset. |
| | 0 | Disable di/dt mechanism. |
| | 1 | Enable di/dt mechanism. |
| 62 | | Enb1DPLL: Enables the nagative feedback loop that determines the di/dt and switching speed of the output buffers during ColdReset and during normal operation. |
| | 0 | Disable di/dt control mechanism. |
| | 1 | Enable di/dt control mechanism. |
| 63 | | DsblPLL: Enables PLLs that match MasterIn and produce RClock, TClock SClock and the internal clocks. |
| | 0 | Enable PLLs. |
| | 1 | Disable PLLs. |
| 64 | | SRTristate: Controls when output-only pins are tristated. |
| | 0 | Only when ColdReset* is asserted. |
| | 1 | When Reset* or ColdReset* are asserted. |
| 65:255 | | Reserved. Scan in zeros. |

What is claimed is:

1. In a computer system having a processor chip, an external system, and a master clock generator off said processor chip, said master clock generator providing a master clock signal, the improvement comprising:

means for communicating said master clock signal to a first input terminal of said processor chip;

means, on said processor chip and responsive to said master clock signal and to an incoming synchronization signal on a second input terminal of said processor chip, for generating an internal clock signal at a frequency that is a predetermined multiple of said master clock frequency;

means, on said processor chip and responsive to said internal clock signal, for generating at a first output terminal of said processor chip an external clock signal, designated SyncOut, at the master clock frequency;

means, off said processor chip, for communicating an indication of a desired frequency divisor to said processor chip;

means, on said processor chip and responsive to said internal clock signal, for generating at least one external clock signal at a fraction of said master clock frequency specified by said desired frequency divisor; and a feedback connection off said processor chip coupling said SyncOut signal between said first output terminal and said second input terminal that feeds back said SyncOut signal to said means for generating an internal clock signal, whereupon said means for generating an internal clock signal causes said SyncOut signal, as received at said second input terminal, to be synchronized with said master clock signal;

wherein said means for generating at least one external clock signal generates a pair of external clock signals in a predetermined phase relationship with each other.

2. A computer system comprising:

a processor chip having a master clock input terminal, a synchronization input terminal, a synchronization output terminal, and a system clock output terminal;

system logic off said processor chip having a system clock input terminal;

a master clock generator off said processor chip, said master clock generator providing a master clock signal at a master clock frequency to said master clock input terminal;

a phase-lock loop (PLL) on said processor chip that receives said master clock signal and provides a PLL signal at a frequency that is an integral multiple of said master clock frequency, said PLL being further responsive to a synchronization signal at said synchronization input terminal;

a programmable clock divider on said processor chip that receives said PLL signal and generates (a) at least one external clock signal at said system clock output terminal at a frequency equal to the frequency of said PLL signal divided by a desired one of a plurality of divisors, and (b) a signal, designated SyncOut, at said synchronization output terminal at said master clock frequency, said SyncOut signal being synchronized with said at least one external clock signal at said system clock output terminal;

a connection off said processor chip coupling said at least one external clock signal between said system clock output terminal of said processor chip and said system clock input terminal of said system logic to allow said system logic to operate synchronously with respect to said at least one external clock signal; and a feedback connection off said processor chip coupling said SyncOut signal between said synchronization output terminal of said processor chip and said synchronization input terminal of said processor chip that feeds back said SyncOut signal to said PLL, whereupon said PLL causes said SyncOut signal, as received at said synchronization input terminal, to be synchronized with said master clock signal;

wherein said at least one external clock signal includes a pair of external clock signals in a predetermined phase relationship with each other.

3. The computer system of claim 2 wherein said second circuit connection is characterized by a particular delay, which causes said at least one external clock signal to be advanced by an amount equal to said particular delay relative to said master clock signal.

4. The computer system of claim 2 wherein:

said first circuit connection includes a first buffer characterized by a particular delay; and said second circuit connection includes a second buffer characterized by said particular delay, which causes said at least one external clock signal to be advanced by an amount equal to said particular delay relative to said master clock signal, thereby causing said at least one external clock signal after said first buffer to be synchronized with said master clock signal and compensating for said delay caused by said first buffer.

5. The computer system of claim 2, and further comprising a non-volatile memory off said processor chip containing a representation of said desired one of said plurality of frequency divisors.

* * * * *